UNITED STATES PATENT OFFICE.

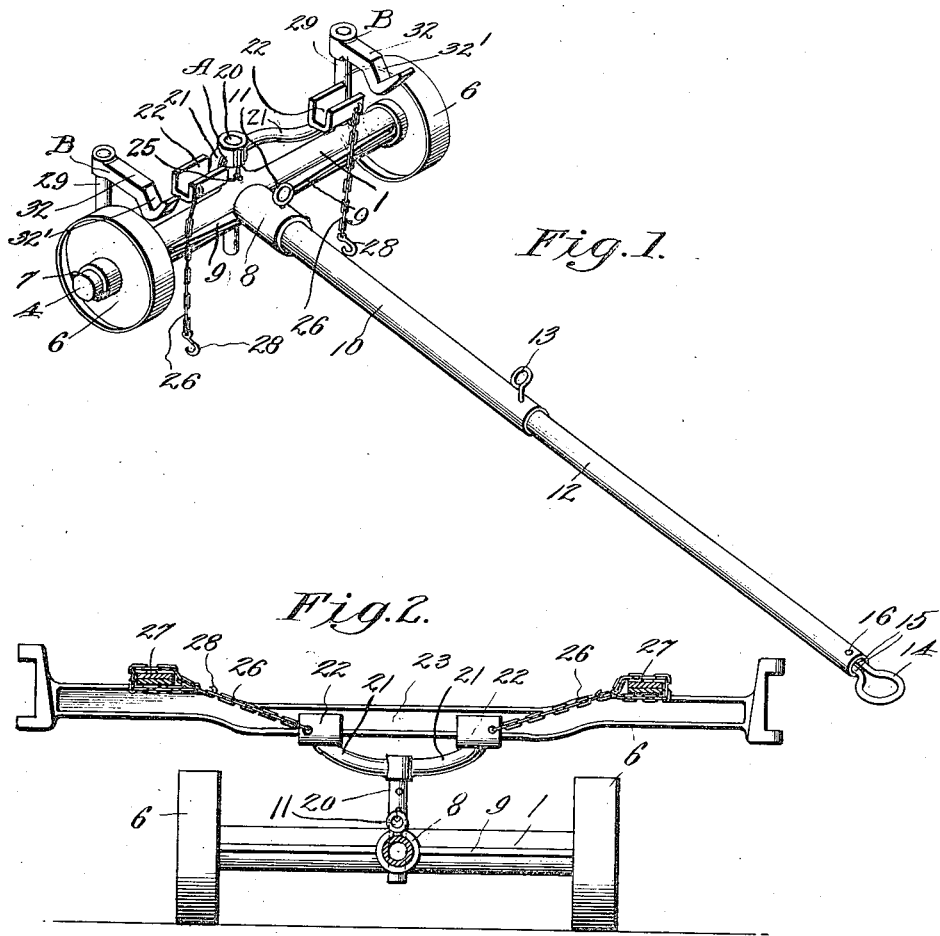

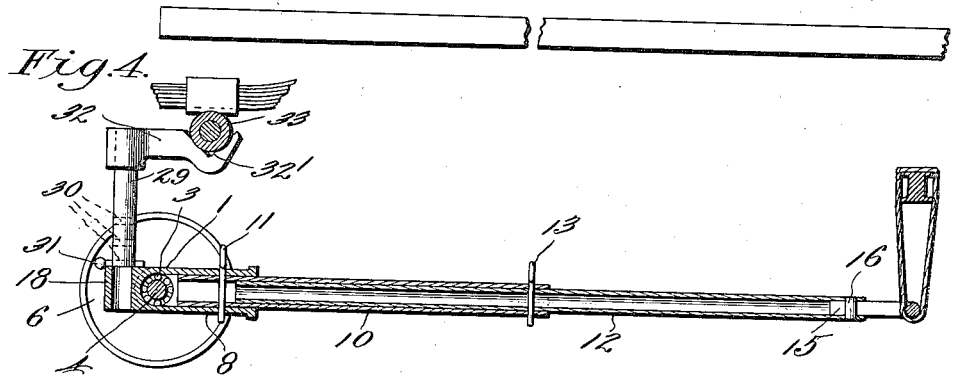
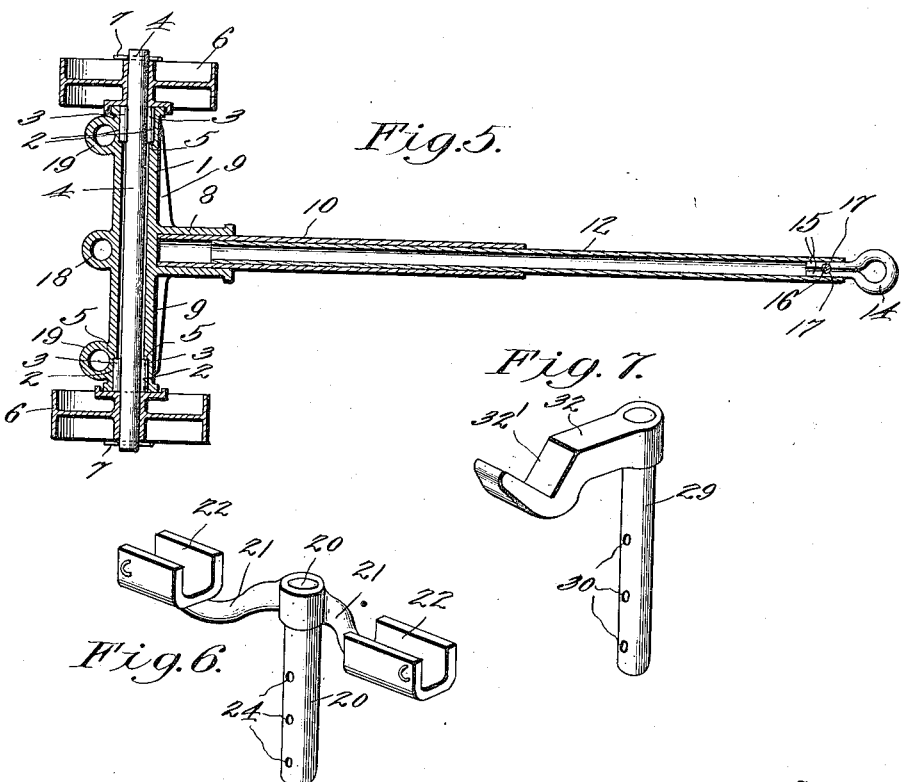

IRA S. MOSHER, OF CHICAGO, ILLINOIS.

AUTOMOBILE-AMBULANCE.

1,241,418.

Specification of Letters Patent.   Patented Sept. 25, 1917.

Application filed November 25, 1916.   Serial No. 133,462.

*To all whom it may concern:*

Be it known that I, IRA S. MOSHER, a subject of the King of Great Britain, residing at Chicago, in the county of Cook and State of Illinois, have invented new and useful Improvements in Automobile - Ambulances, of which the following is a specification.

This invention relates to automobile ambulances or wrecking trucks the object in view being to produce a device of the character referred to which is convertible to the extent that it may be used either for supporting the front axle or the rear axle of a vehicle to sustain the wheels thereof out of contact with the ground and enable the vehicle to be towed to a place of repair by another vehicle either with or without the assistance of an operater in the vehicle being towed.

A further object of the invention is to provide a device of the character referred to in which the parts are so associated that they may be separated and compactly stored in a vehicle while proceeding toward the place where the injured vehicle is located.

Another object of the invention is to provide in connection with the supporting means of the device, means for so anchoring the injured vehicle thereon that said vehicle is prevented from slipping laterally as well as longitudinally.

With the above and other objects in view, the invention consists in the novel construction, combination and arrangement of parts, herein described, illustrated and claimed.

In the accompanying drawings:—

Figure 1 is a perspective view of the improved wrecking truck or ambulance.

Fig. 2 is a front elevation showing the device in its relation to the front axle of an automobile, the tongue being shown in section.

Fig. 3 is a rear elevation of a sufficient portion of an automobile to illustrate the applied relation of the device to the rear axle housing.

Fig. 4 is a vertical longitudinal section showing the applied position of the device to the front and rear axles while supporting the rear axle.

Fig. 5 is a horizontal section through the frame and tongue of the device.

Fig. 6 is a detached perspective view of the front axle support or rest.

Fig. 7 is a similar view of one of the rear axle supports or rests.

The frame of the automobile ambulance or wrecking truck, comprises a tubular non-rotary axle housing 1 formed in the opposite ends thereof with channels or recesses 2 for anti-friction rollers 3 which sustain with a minimum amount of friction an axle 4 which is thus capable of rotation within the housing 1. The inner ends of the rollers are prevented from moving inwardly by means of internal annular shoulders 5 within the housing 1 and said rolls are prevented from moving outwardly or becoming displaced from the housing by means of the carrying wheels 6, two of which are employed, one at each end of the housing and mounted rotatably upon the adjacent end of the axle 4 which projects sufficiently beyond the housing to receive said wheel. To hold the wheels in place on the axle 4, keys 7 shown in the form of cotter pins are inserted through diametrical holes in the ends of the axle 4.

Extending at right angles to the housing 1 is a tubular pole or tongue receiving socket extension 8 which together with the adjacent portion of the housing 1 is reinforced by means of webs or flanges 9. The pole or tongue comprises a primary section 10 of tubular formation the rear end of which is inserted in the socket extension 8 and detachably secured therein by means of a removable pin 11. Another tubular pole or tongue section 12 is telescopically fitted in the section 10 and is held in fixed relation thereto but adapted to be detached therefrom by means of another pin or key 13. 14 designates a metal loop or clevis the rear end portions 15 of which are inserted in the forward extremity of the pole section 12 and secured in place therein by means of a pin or key 16 inserted through diametrically opposite holes in the section 12 and engaging correspondingly shaped depressions or key-ways 17 in the end portions of the clevis 14.

At its rear side, the housing 1 is formed with a central sleeve-like socket 18 and is also formed at the rear side thereof and at points equi-distant from the socket 18 with similar sleeve-like sockets 19. The central socket 18 is adapted to receive a vertically adjustable upright or post 20 having journaled on the upper end thereof a bifurcated axle support or rest designated generally at A and comprising two laterally extending arms 21 each terminating in an upwardly opening saddle 22 in which the front axle 23 of a vehicle is adapted to rest in the manner illustrated in Fig. 2. The post 20 is provided with a vertical series of holes 24 to receive a pin 25 which engages the sleeve 18, thus enabling the support A to be adjusted vertically and sustained at any desired point of elevation according to the height of the axle 23.

To prevent lateral shifting of the vehicle being towed and supported by the truck, lateral stay chains 26 are secured at one end to the arms 21 and are of sufficient length to be passed around the front springs 27 of the vehicle, said chains being provided at their free ends with hooks 28 adapted to be placed in engagement with suitable links of the chains in the manner illustrated in Fig. 2.

Other rear axle housing supports designated generally at B comprise upright posts 29 which are shiftable vertically in the sockets 19, each of said posts 29 being provided with a vertical series of holes 30 to receive a pin 31, enabling the post to be adjusted to any desired elevation and sustained at the point of adjustment. Mounted upon the upper end of each post 29 is a forwardly extending arm 32 having a V-shaped saddle 32' designed to extend under the rear axle housing 33 of the vehicle as shown in Figs. 3 and 4, the saddle 32' being disposed at opposite sides of the housing 34 in which the differential gearing is located and being also located between the rear vehicle springs 35 thereby preventing the lateral shifting of the rear end portion of the vehicle on the wrecking truck. When used in conjunction with the rear axle, for supporting the latter, the truck is arranged as shown in Fig. 4, the axle housing 33 resting upon the saddles 32' so that the weight is located forward of the axle 4 of the truck thereby preventing the truck from tilting rearwardly and releasing the rear axle of the vehicle. The tongue or pole comprising the members 10 and 12 is of sufficient length to extend to a point in close proximity to the front axle 23 so that a chain or rope may be passed through the clevis or eye 14 and around the front axle 23. A suitable tow rope or cable may then be used to connect the rear vehicle to the vehicle towing the same. Where the device is used for supporting the front axle of the machine, the frame of the truck is prevented from tilting rearwardly by off-setting arms 21 and the saddle 22 in a forward direction in the same manner as the saddles 32' so that the weight will be imposed upon the truck at a point in advance of the axle 4 thereof. A rope or cable may then be passed through the clevis or eye 14 and fastened to the rear axle housing or other convenient part of the frame of the towing machine.

From the foregoing description taken in connection with the accompanying drawings it will now be understood that the wrecking truck is adapted to support either the front or rear axle of an automobile or other vehicle to enable the same to be towed to a place of repair. When used in conjunction with the front axle, the rear axle supporting members B are preferably removed and when the device is used in conjunction with the rear axle, the front axle supporting member A is preferably removed. When the device is not in use or is being transported from one place to another, both sections of the tongue or pole may be detached, and also the axle supporting members A and B. This enables the device to be compactly stored and transported. Furthermore the axle supporting devices are adjustable in height to accommodate vehicles of different makes. The wheels 6 are also detachable to render the device as a whole still more compact.

I claim:

In a wrecking truck, an axle housing, a draft pole or tongue detachably connected thereto, a rotatable axle extending through said housing and projecting beyond the ends thereof, carrying wheels journaled on the projecting ends of said axle, a tubular socket located mid-way between the ends of said housing and formed integrally therewith, other sockets formed integrally with said housing and located equi-distantly at opposite sides of the first named socket, and a plurality of axle supporting members detachably and adjustably mounted in said sockets, each of said supporting members comprising a post slidably fitted in the respective socket, and a vehicle axle supporting saddle carried by each post and located in advance of the truck axle.

In testimony whereof I affix my signature.

IRA S. MOSHER.